United States Patent [19]
Phelps

[11] Patent Number: 5,154,683
[45] Date of Patent: Oct. 13, 1992

[54] CLUTCH HAVING ROTATABLE FRICTION RINGS

[75] Inventor: Orville E. Phelps, Toledo, Ohio

[73] Assignee: Dana Corporation, Toledo, Ohio

[21] Appl. No.: 794,076

[22] Filed: Nov. 19, 1991

[51] Int. Cl.$^5$ .................. F16D 13/00; F16D 13/68
[52] U.S. Cl. .................. 192/70.14; 192/107 R; 192/107 M; 192/70.17
[58] Field of Search ............ 192/70.14, 70.11, 107 R, 192/107 M, 106.2, 70.17, 70.19

[56] References Cited

U.S. PATENT DOCUMENTS

| | | | |
|---|---|---|---|
| 672,800 | 4/1901 | Newson | 192/70.23 |
| 1,285,718 | 11/1918 | Jeffers | 192/107 R |
| 1,341,673 | 6/1920 | Repony | 192/107 R |
| 1,702,000 | 2/1929 | Gibson et al. | 192/107 R |
| 2,163,152 | 6/1939 | Palm | 192/70.14 |
| 2,519,865 | 8/1950 | Wellman | 192/107 R |
| 2,902,130 | 9/1959 | Halberg et al. | 192/70.14 X |
| 2,927,673 | 3/1960 | Sand | 192/70.14 |
| 3,231,058 | 1/1966 | Batchelor et al. | 192/107 R |
| 3,398,822 | 8/1968 | Eakin | 192/70.14 X |
| 3,664,472 | 5/1972 | Martini et al. | 192/70.14 X |
| 3,695,406 | 10/1972 | Graham et al. | 192/107 M |
| 4,349,093 | 9/1982 | Tsujio | 192/107 R |
| 4,533,032 | 8/1985 | Lamarche | 192/107 M |
| 4,951,793 | 8/1990 | Hays | 192/70.27 |

FOREIGN PATENT DOCUMENTS 876750 9/1987 South Africa .

Primary Examiner—Rodney H. Bonck
Assistant Examiner—Andrea Pitts
Attorney, Agent, or Firm—MacMillan, Sobanski & Todd

[57] ABSTRACT

A friction clutch including a flywheel and a pressure plate which frictionally engage the driven disc assembly during use is disclosed. A pair of friction rings are mounted respectively on the flywheel and the pressure plate for engaging the driven disc assembly therebetween. Each of the friction rings includes a rigid backing plate having a first friction element secured to one face thereof and a second friction element secured to opposite face thereof. The first friction elements are formed from a material having a relatively low coefficient of friction, while the second friction elements are formed from a material having a relatively high coefficient of friction. Retainers are provided for retaining the friction rings to the flywheel and the pressure plate, while permitting restricted relative rotational movement therebetween. When the clutch is engaged, the second friction elements rapidly engage the driven disc assembly, causing the friction rings to initially rotate relative to the flywheel and the pressure plate. After this initial engagement is complete, the driven disc assembly and the friction rings all rotate together as a unit with the flywheel and the pressure plate.

21 Claims, 2 Drawing Sheets

CLUTCH HAVING ROTATABLE FRICTION RINGS

BACKGROUND OF THE INVENTION

This invention relates in general to clutches and in particular to a friction clutch having rotatable friction rings mounted respectively on the flywheel and the pressure plate for engaging a driven disc assembly therebetween.

Clutches are well known devices which are frequently employed in vehicles to selectively connect a source of rotational power, such as the crankshaft of an engine, to a driven mechanism, such as a transmission. Typically, a cover of the clutch is connected to a flywheel carried on the end of the engine crankshaft for rotation therewith. Between the flywheel and the clutch cover, a pressure plate is disposed. The pressure plate is connected for rotation with the flywheel and the cover, but is permitted to move axially relative thereto. A shift lever assembly is provided for selectively moving the pressure plate back and forth in the axial direction.

A driven disc assembly is disposed within the clutch between the pressure plate and the flywheel. The driven disc assembly is carried on an output shaft of the clutch, which is also the input shaft to the transmission. When the pressure plate is moved toward the flywheel, the driven disc assembly is frictionally engaged therebetween so as to cause the output shaft of the clutch to rotate with the flywheel, the cover, and the pressure plate. In this manner, the clutch is engaged to transmit power from the engine to the transmission to drive the vehicle. When the pressure plate is moved away from the flywheel, the driven disc assembly is released from such frictional engagement so as to disconnect this driving connection. The clutch is typically disengaged to permit a gear shifting operation to occur within the transmission.

The transmission is often provided with a conventional synchronizer mounted on the input shaft thereto. The synchronizer is provided with one or more friction surfaces. When the clutch is disengaged and a shifting operation is about to occur, the synchronizer friction surface engages a corresponding surface formed on a selected transmission gear so as to synchronize the rotational speeds of the input shaft and the selected gear. Such speed synchronization is necessary to prevent undesirable clashing of the gear teeth during the shifting operation. Because of the relatively large inertia of the various rotating gears within the transmission, the synchronizer primarily alters the rotational speed of the input shaft of the transmission to correspond with the rotational speed of the selected transmission gear when a shifting operation is about to occur.

However, as mentioned above, the driven disc assembly is usually mounted on the input shaft of the transmission for rotation therewith. As a result, the inertial load applied to the synchronizer during frictional engagement with the selected transmission gear is determined by the sum of the weight of the input shaft and the weight of the driven disc assembly. Thus, the weight of the driven disc assembly is an important factor in rotational inertia of the driven disc assembly and, consequently, the operation of the transmission. Therefore, to reduce wear on the synchronizer and otherwise improve the overall quality of the shifting operation, it is desirable to maintain the weight of the driven disc assembly at a minimum.

SUMMARY OF THE INVENTION

This invention relates to an improved structure for a friction clutch in which the rotational inertia of the driven disc assembly is maintained at a minimum. The clutch includes a flywheel and a pressure plate which are adapted to frictionally engage the driven disc assembly during use. A pair of friction rings are mounted respectively on the flywheel and the pressure plate for engaging the driven disc assembly therebetween. Each of the friction rings includes a rigid backing plate having a first friction element secured to one face thereof and a second friction element secured to opposite face thereof. The first friction elements are formed from a material having a relatively low coefficient of friction, while the second friction elements are formed from a material having a relatively high coefficient of friction. Means are provided for retaining the friction rings to the flywheel and the pressure plate, while permitting restricted relative rotational movement therebetween. When the clutch is engaged, the second friction elements rapidly engage the driven disc assembly, causing the friction rings to initially rotate relative to the flywheel and the pressure plate. After this initial engagement is complete, the driven disc assembly and the friction rings all rotate together as a unit with the flywheel and the pressure plate.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
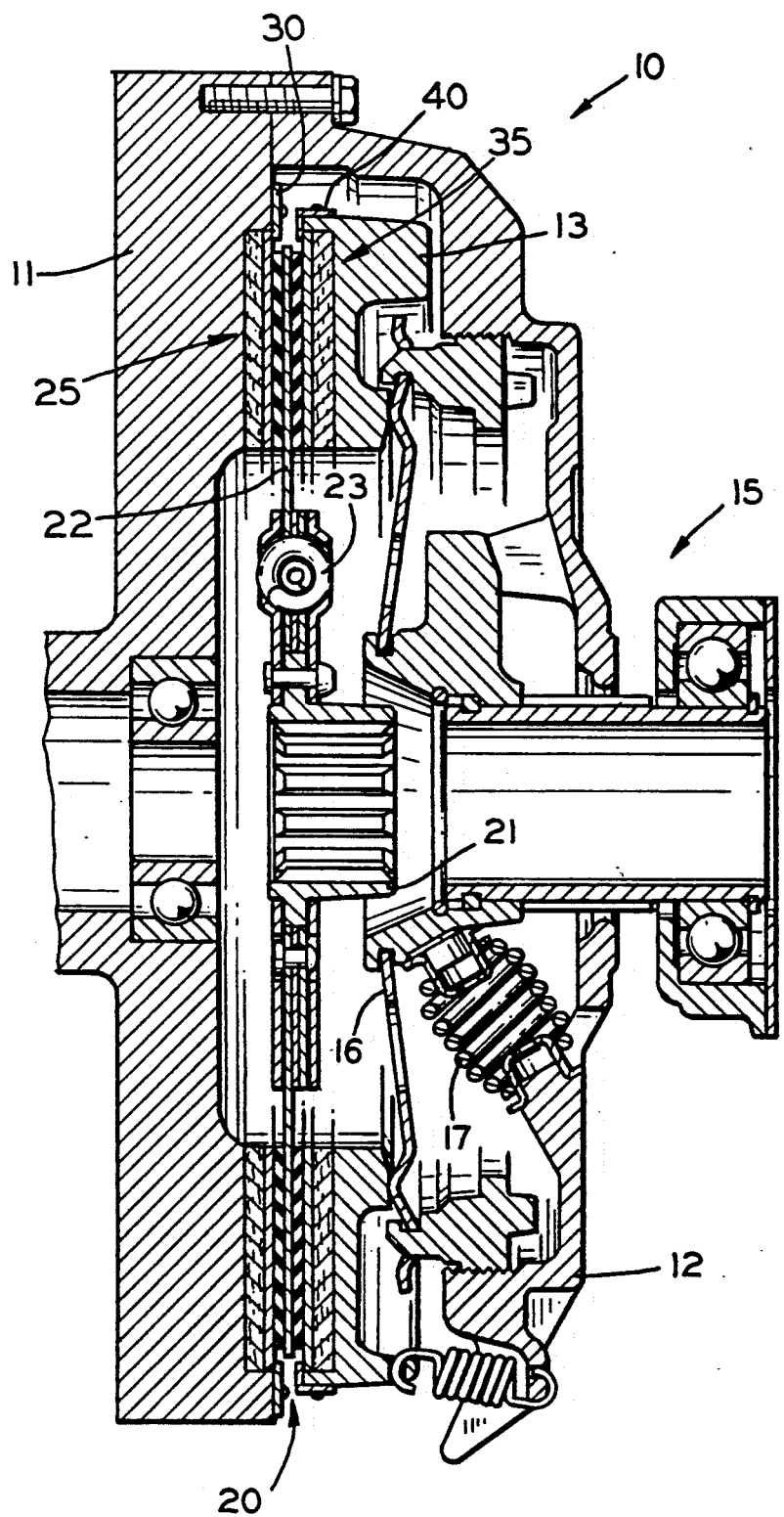
FIG. 1 is a sectional side elevational view of a friction clutch in accordance with this invention.

Referring now to the drawings, there is illustrated in FIG. 1 a spring-loaded friction clutch, indicated generally at 10, which is adapted for use in a vehicle. The general structure and operation of the clutch 10 are well known in the art, and only those portions of the clutch 10 which are necessary for a complete understanding of this invention will be described here. The clutch 10 includes a flywheel 11, which may be connected to a crankshaft (not shown) of an engine of the vehicle or a similar source of rotational energy. Rotational movement of the crankshaft by the vehicle engine, therefore, causes corresponding rotational movement of the flywheel 11.

A cover 12 is connected to the flywheel for rotation therewith. A pressure plate 13 is disposed between the flywheel 11 and the cover 12. Conventional means (not shown) are provided for connecting the pressure plate 13 to the cover 12 for rotation therewith, while permitting the pressure plate 13 to move axially relative thereto. An operating mechanism is provided for selectively moving the pressure plate 13 toward and away from the flywheel 11. The operating mechanism includes an axially movable release retainer assembly, indicated generally at 15, and a plurality of levers 16 (only two are shown). In a manner which is well known in the art, axial movement of the release retainer assembly 15 causes pivoting movement of the levers 16 and consequent axial movement of the pressure plate 13 between engaged and disengaged positions.

A plurality of angled springs 17 (only one is shown) extend between the cover 12 and the release retainer assembly 15. The angled springs 17 urge the release retainer assembly 15 (and, thus, the pressure plate 13) toward the flywheel 11 and the engaged position. A shift lever assembly (not shown) or similar means is provided for selectively moving the release retainer assembly 15 and the pressure plate 13 away from the flywheel 11 against the urging of the angled springs 17 to the disengaged position.

A driven disc assembly, indicated generally at 20, is disposed between the flywheel 11 and the pressure plate 13. The driven disc assembly 20 includes a hub 21, a support plate 22 mounted on the hub 21 for limited relative rotational movement, and a plurality of springs 23 (only one is illustrated) connected between the hub 21 and the support plate 22. The hub 21 is splined or otherwise connected to an output shaft (not shown) of the clutch 10 for rotation therewith. As is well known, the springs 23 function to dampen torsional vibrations transmitted from the engine, while still providing a driving connection between the hub 21 and the support plate 22. Thus, when the pressure plate 13 is moved toward the flywheel 11, the driven disc assembly 20 is frictionally engaged therebetween, causing it (and the output shaft) to rotate with the flywheel 11, the cover 12, and the pressure plate 13. The structure of the clutch 10 thus far described is conventional in the art.

Figure 2:
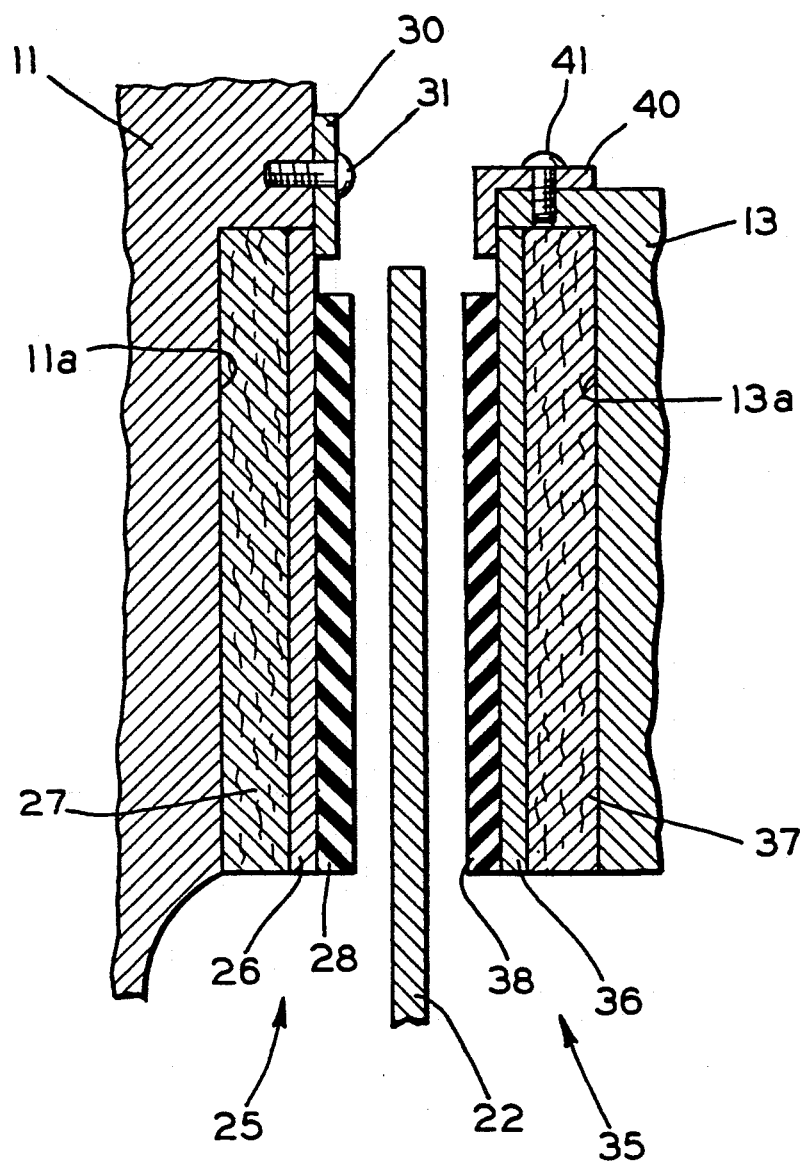
FIG. 2 an enlarged sectional elevational view of a portion of the friction clutch illustrated in FIG. 1.

Referring now to FIG. 2, it can be seen that a circular recessed area 11a is formed in the surface of the flywheel 11 facing toward the support plate 22. A first friction ring, indicated generally at 25, is disposed within the recessed area 11a of the flywheel 11. The first friction ring 25 includes a central backing plate 26 having a first friction element 27 secured to one face thereof (between the backing plate 26 and the flywheel 11) and a second friction element 28 secured to opposite face thereof (between the backing plate 26 and the support plate 22).

The backing plate 26 is preferably formed from a strong and rigid material, such as steel. The first friction element 27 is preferably formed from a material having a relatively low coefficient of friction. For example, the first friction element 27 may be formed from a conventional ceramic, organic, or metallic based clutch facing material having a coefficient of friction in the range of from 0.25 to 0.35. The second friction element 28 is preferably formed from a material having a relatively high coefficient of friction. For example, the second friction element 28 may be formed from a conventional rubber based clutch facing material having a coefficient of friction in the range of 0.70 or higher.

Means are provided for retaining the first friction ring 25 within the recessed area 11a of the flywheel 11, while permitting relative rotational movement therebetween. In the illustrated embodiment, an annular retainer plate 30 is secured to the flywheel 11 by a plurality of threaded fasteners 31 (only one is illustrated) for this purpose. The radially innermost portion of the retainer plate 30 extends over the radially outermost portion of the backing plate 26 of the first friction ring 25. As a result, the first friction ring 25 is retained within the recessed area 11a of the flywheel 11. However, the retainer plate 30 does not prevent rotational movement of the first friction ring 25 relative to the flywheel 11 Rather, the retainer plate 30 preferably engages the backing plate 26 so as to compress the first friction element 27 against the surface of the flywheel 11. Thus, although the retainer plate 30 does not prevent rotational movement of the first friction ring 25 relative to the flywheel 11, the friction created by the engagement of the first friction element 27 with the flywheel 11 does tend to resist such relative rotational movement. The purpose for this frictional engagement will be described below.

A circular recessed area 13a is also formed in the surface of the pressure plate 13 facing toward the support plate 22. A second friction ring, indicated generally at 35, is disposed within the recessed area 13a of the pressure plate 13. The second friction ring 35 is preferably formed having the same structure as the first friction ring 25. Thus, the second friction ring 35 includes a central backing plate 36 having a first friction element 37 secured to one face thereof (between the backing plate 36 and the pressure plate 13) and a second friction element 38 secured to opposite face thereof (between the backing plate 36 and the support plate 22). The backing plate 36, the first friction element 37, and the second friction element 38 are preferably formed from the same materials as the above-described backing plate 26, the first friction element 27, and the second friction element 28.

Means are provided for retaining the second friction ring 35 within the recessed area 13a of the pressure plate 13, while permitting relative rotational movement therebetween. In the illustrated embodiment, a plurality of retainer clips 40 are secured to the pressure plate 13 by respective threaded fasteners 41 (only one is illustrated) for this purpose. Each of the retainer clips 40 includes a portion which extends over the radially outermost portion of the backing plate 36 of the second friction ring 35. As a result, the second friction ring 35 is retained within the recessed area 13a of the pressure plate 13. However, the retainer clips 40 do not prevent rotational movement of the second friction ring 35 relative to the pressure plate 13. Rather, the retainer clips 40 preferably engage the backing plate 36 so as to compress the first friction element 37 against the surface of the pressure plate 13. Thus, although the retainer clips 40 do not prevent rotational movement of the second friction ring 35 relative to the pressure plate 13, the friction created by the engagement of the first friction element 37 with the pressure plate 13 does tend to resist such relative rotational movement. The purpose for this frictional engagement will also be described below.

In operation, the flywheel 11 and the pressure plate 13 rotate together during use, and the pressure plate 13 is moved axially toward and away from the flywheel 11 so as to engage and disengage the clutch 10. When the clutch 10 is disengaged, the first and second friction rings 25 and 35 rotate with the flywheel 11 and the pressure plate 13, respectively. When the pressure plate 13 is moved toward the flywheel 11 to engage the clutch 10, the support plate 22 is engaged by the second friction elements 28 and 38 of the friction rings 25 and 35, respectively. As mentioned above, the second friction elements 28 and 38 are formed from a material having a relatively high coefficient of friction. Because of this, the support plate 22 is rapidly engaged by the second friction elements 28 and 38 when the pressure plate 13 is moved to the engaged position.

However, as mentioned above, the first and second friction rings 25 and 35 are permitted to rotate relative to the flywheel 11 and the pressure plate 13. As a result, when the support plate 22 is frictionally engaged by the second friction elements 28 and 38, the friction rings 25 and 35 initially rotate relative to the flywheel 11 and the pressure plate 13. This relative rotation permits the support plate 22 to be gradually accelerated to the rotational speed of the flywheel 11 and the pressure plate 13, thus preventing transient torque shocks from being generated when the clutch 10 is engaged.

Because of the frictional engagement of the friction rings 25 and 35 with the flywheel 11 and the pressure plate 35, respectively, the amount of relative rotational movement therebetween is small. Preferably, the frictional force generated by the retainer ring 30 and the retainer clips 40 is large enough such that the friction rings 25 and 35 will rotate only about one-half of one revolution relative to the flywheel 11 and the pressure plate 13. After this initial engagement and relative rotation is completed, the support plate 22 and the friction rings 25 and 35 all rotate together as a unit until the clutch 10 is subsequently disengaged.

The above-described structure provides several advantages over conventional clutch structures. First, the friction rings 25 and 35 are mounted on the flywheel 11 and the pressure plate 13, respectively, and not on the support plate 22 as is conventional in the art. Thus, the weight of the support plate 22 (and, consequently, the rotational inertia of the driven disc assembly 20) is desirably reduced. Second, the friction rings 25 and 35 are capable of rotating relative to the flywheel 11 and the pressure plate 13, respectively, although restricted by the frictional force generated by the retainer ring 30 and the retainer clips 40. This restricted relative rotational movement limits the amount of transient torque shocks which can be generated when the clutch 10 is engaged. As a result, the likelihood of damage to the clutch 10 or the transmission (not shown) connected thereto resulting from rapid engagement of the clutch 10 is reduced. Third, heat which is generated by the engagement of the clutch 10 is located away from the support plate 22 on the surfaces of the flywheel 11 and the pressure plate 13. Since the flywheel 11 and the pressure plate 13 are typically formed from relatively large pieces of metal, they function well as heat sinks to dissipate such generated heat during operation.

In accordance with the provisions of the patent statutes, the principle and mode of operation of this invention have been explained and illustrated in its preferred embodiment. However, it must be understood that the present invention may be practiced otherwise than as specifically explained and illustrated without departing from its spirit or scope. For example, the first friction ring 25 may be retained to the flywheel 11 by a plurality of retainer clips 40, instead of the illustrated retainer ring 30. Similarly, the second friction ring 35 may be retained to the pressure plate 13 by a retainer ring 30, instead of the illustrated plurality of retainer clips 40.

What is claimed is:

1. A clutch assembly comprising:
   a flywheel adapted for rotation;
   a cover attached to said flywheel for rotation therewith;
   a pressure plate disposed between said flywheel and said cover, said pressure plate being connected to said cover for rotation therewith and for axial movement relative thereto between engaged and disengaged positions;
   a first friction ring;
   means for retaining said first friction ring on one of said flywheel and said pressure plate while permitting relative rotational movement between said first friction ring and said one of said flywheel and said pressure plate;
   a second friction ring;
   means for retaining said second friction ring on the other of said flywheel and said pressure plate; and
   a driven disc assembly disposed between said first and second friction rings, said driven disc assembly frictionally engaged by said first and second friction rings when said pressure plate is in said engaged position.

2. The invention defined in claim 1 wherein said flywheel has a recessed area formed therein, and wherein said first friction ring is disposed in said recessed area for rotation relative thereto.

3. The invention defined in claim 1 wherein said pressure plate has a recessed area formed therein, and wherein said first friction ring is disposed in said recessed area for rotation relative thereto.

4. The invention defined in claim 1 wherein said first friction ring includes a backing plate having a pair of opposed faces, a first friction element secured to a first face thereof and a second friction element secured to a second face thereof, said second friction element being positioned so as to frictionally engage said driven disc assembly.

5. The invention defined in claim 4 wherein said first friction element is formed from a material having a coefficient of friction which is less than a coefficient of friction of the material forming said second friction element.

6. The invention defined in claim 4 wherein said first friction element is formed from a material having a coefficient of friction in a range from 0.25 to 0.35.

7. The invention defined in claim 4 wherein said second friction element is formed from a material having a coefficient of friction which is at least 0.70.

8. The invention defined in claim 1 wherein said means for retaining said first friction ring includes a retainer plate secured to said one of said flywheel and said pressure plate, said retainer plate engaging said first friction ring to retain it on said one of said flywheel and said pressure plate while permitting relative rotational movement therebetween.

9. The invention defined in claim 1 wherein said means for retaining said first friction ring includes a plurality of retainer clips secured to said one of said flywheel and said pressure plate, said retainer clips engaging said first friction ring to retain it on said one of said flywheel and said pressure plate while permitting relative rotational movement therebetween.

10. The invention defined in claim 1 wherein said means for retaining said second friction ring on the other of said flywheel and said pressure plate permits relative rotational movement therebetween.

11. The invention defined in claim 10 wherein each of said flywheel and said pressure plate has a recessed area formed therein, and wherein said first and second friction rings are disposed in said recessed areas for rotation relative thereto.

12. The invention defined in claim 10 wherein each of said first and second friction rings includes a backing plate having a pair of opposed faces, a first friction element secured to a first face thereof and a second friction element secured to a second face thereof, said second friction elements being positioned so as to frictionally engage said driven disc assembly.

13. The invention defined in claim 12 wherein said first friction elements are formed from a material having a coefficient of friction which is less than a coefficient of friction of the material forming said second friction elements.

14. The invention defined in claim 12 wherein said first friction elements are formed from a material having a coefficient of friction in a range from 0.25 to 0.35.

15. The invention defined in claim 12 wherein said second friction elements are formed from a material having a coefficient of friction which is at least 0.70.

16. A flywheel adapted for use in a clutch assembly comprising:
 a body;
 a friction ring; and
 means for retaining said friction ring on said body while permitting relative rotational movement between said friction ring and said body.

17. The invention defined in claim 16 wherein said means for retaining said friction ring includes a retainer plate secured to said body, said retainer plate engaging said friction ring to retain it on said body while permitting relative rotational movement therebetween.

18. The invention defined in claim 16 wherein said means for retaining said friction ring includes a plurality of retainer clips secured to said body, said retainer clips engaging said friction ring to retain it on said body while permitting relative rotational movement therebetween.

19. A pressure plate adapted for use in a clutch assembly comprising:
 a body;
 a friction ring; and
 means for retaining said friction ring on said body while permitting relative rotational movement between said friction ring and said body.

20. The invention defined in claim 19 wherein said means for retaining said friction ring includes a retainer plate secured to said body, said retainer plate engaging said friction ring to retain it on said body while permitting relative rotational movement therebetween.

21. The invention defined in claim 19 wherein said means for retaining said friction ring includes a plurality of retainer clips secured to said body, said retainer clips engaging said friction ring to retain it on said body while permitting relative rotational movement therebetween.

* * * * *